United States Patent

Shinada

[11] Patent Number: 5,132,834
[45] Date of Patent: Jul. 21, 1992

[54] METHOD OF INPUTTING SIGNALS TO LIGHT MODULATOR AND SIMULTANEOUS MULTI-BEAM TYPE LIGHT MODULATING APPARATUS

[75] Inventor: Hidetoshi Shinada, Kanagawa, Japan

[73] Assignee: Fuji Photo Film Co., Ltd., Kanagawa, Japan

[21] Appl. No.: 675,006

[22] Filed: Mar. 26, 1991

[30] Foreign Application Priority Data

Apr. 19, 1990 [JP] Japan .................. 2-103895

[51] Int. Cl.$^5$ .............. G02F 1/11; G02F 1/33; H04J 4/00; G01D 9/42
[52] U.S. Cl. .................. 359/285; 359/305; 359/312; 359/123; 346/108
[58] Field of Search ............ 370/23, 57, 70, 69.1, 370/120, 118; 455/316, 256; 359/115, 123, 286, 305, 312, 568, 285; 358/300, 302; 346/108, 160, 76 L

[56] References Cited

U.S. PATENT DOCUMENTS

| | | | |
|---|---|---|---|
| 3,935,566 | 1/1976 | Snopko | 359/312 |
| 4,336,981 | 6/1982 | Mori | 359/312 |
| 4,432,613 | 2/1984 | Ueda et al. | 359/312 |
| 4,444,470 | 4/1984 | Ioka et al. | 359/312 |
| 4,799,777 | 1/1989 | Edouard et al. | 359/312 |
| 4,882,775 | 11/1989 | Coleman | 359/115 |
| 5,079,568 | 1/1992 | Shinada | 359/285 |

FOREIGN PATENT DOCUMENTS

| | | |
|---|---|---|
| 53-9856 | 4/1978 | Japan . |
| 54-5455 | 1/1979 | Japan . |
| 57-41618 | 3/1982 | Japan . |
| 63-5741 | 2/1988 | Japan . |

Primary Examiner—Eugene R. LaRoche
Assistant Examiner—Evelyn A. Lester
Attorney, Agent, or Firm—Sughrue, Mion, Zinn, Macpeak & Seas

[57] ABSTRACT

Disclosed herein is a method of mixing together a plurality of inputted high-frequency signals whose frequency intervals are equal to each other so as to input the thus-mixed high-frequency signals to a multi-frequency acousto-optic device for dividing incident laser beams with the density according to the amplitude of each of the inputted high-frequency signals and in the direction corresponding to the frequency of each inputted high-frequency signal so as to radiate the thus-divided laser beams therefrom. The high-frequency signals whose frequencies are free from being adjacent to each other are mixed together, and the thus-mixed high-frequency signals are further mixed into one, thereby inputting the mixture to the acousto-optic device. Since the frequencies of high-frequency signals to be mixed first are not adjacent from each other, third-order harmonic signals appear at positions where they are dispersed. It is therefore possible to suppress the influence of third-order harmonic distortion upon the density of an image to the utmost.

20 Claims, 8 Drawing Sheets

METHOD OF INPUTTING SIGNALS TO LIGHT MODULATOR AND SIMULTANEOUS MULTI-BEAM TYPE LIGHT MODULATING APPARATUS

BACKGROUND OF THE INVENTION

1) Field of the Invention

The present invention relates to a method of inputting signals to a light modulator and a simultaneous multi-beam type light modulating apparatus, and particularly to a method of mixing together a plurality of inputted signals whose frequencies are different from each other and whose frequency intervals are equal to each other so as to input the thus-mixed signals at a time to a light modulator for dividing incident light beams with the intensity or level according to the amplitude of each of the inputted signals and in the direction corresponding to the frequency of each of the inputted signals so as to emit the thus-divided light beams, and to a simultaneous multi-beam type light modulating apparatus using the signal inputting method referred to above.

2) Description of the Related Art

There has heretofore been known a light modulating apparatus used with a multi-frequency acousto-optic device (hereinafter called merely "AOM") (see Japanese Patent Application Publication No. 63-5741, Japanese Patent Application Laid-Open No. 54-5455, Japanese Patent Application Laid-Open No. 57-41618, and Japanese Patent Application Publication No. 53-9856). A plurality of high-frequency signals whose frequencies differ from each other, which are produced from a plurality of oscillation circuits, are mixed together and the thus-mixed signals are inputted to the AOM used for the light modulating apparatus at a time. Thus, the light modulating apparatus has the problem that since the plurality of high-frequency signals are mixed together, harmonic signals are produced, and hence non-uniformity of the density of an image is produced under the influence of harmonic distortion (two-signal third-order distortion) due to a third-order harmonic signal in particular. Let's now consider a case where eight high-frequency signals are mixed two by two by way of example, and the thus-mixed signals are further mixed together two by two, followed by further mixing of the signals thus mixed, thereby inputting the mixture to the AOM. This method will be described as follows.

Let's now assume that the intervals between adjacent frequencies of high-frequency signals generated from respective oscillation circuits are set equal to each other and their frequencies are represented by $f_1, f_2, \ldots, f_8$ (for example, 110 MHz, 120 MHz, ..., 180 MHz). When the high-frequency signals represented in the form of the frequencies $f_1$ and $f_2$ are mixed together, third-order harmonic signals which provide the maximum intermodulation interference are produced at positions where frequencies $2f_1-f_2$, $2f_2-f_1$ are present as shown in FIG. 7(1). Similarly, when the high-frequency signals represented in the form of the frequencies $f_3$, $f_4$ are mixed together, third-order harmonic signals are produced at positions where frequencies $2f_3-f_4$, $2f_4-f_3$ are present as shown in FIG. 7(2). Thus, if all the signals represented by the frequencies $f_1, f_2, \ldots, f_8$ are mixed together after the signals whose frequencies are adjacent to each other are mixed, third-order harmonic signals are produced at positions where the frequencies $2f_1-f_2, f_1, f_2, \ldots, f_8, 2f_8-f_7$ are present as shown in FIG. 7(3). As a consequence, the signals generated from the respective oscillation circuits are distorted and high-leveled third-order harmonic signals are produced at the positions where the frequencies $2f_1-f_2$, $2f_8-f_7$ are present. Thus, even when the signal represented by the frequency $f_4$ is set to a spaced (OFF) state by way of example, a third-order harmonic signal is produced at the position of the presence of the frequency $f_4$ as shown in FIG. 7(4). In addition, the level of each of the high-frequency signals at the positions where the frequencies $f_3$ and $f_6$ are present is reduced due to the generation of the third-order harmonic signal. Consequently, the laser beams cannot be divided according to the duration (ON) and the space (OFF) of the image data with the AOM, thereby causing the nonuniformity of the density of an image.

When the number of times in which the high-frequency signals are mixed is increased, the intensity or degree of modulation of light according to each of the frequencies is reduced under the influence of high-frequency signals represented by other frequencies. Thus, an approach for controlling the level of each of high-frequency signals mixed together by making use of an AGS (Automatic Gain Control), i.e., the amplitude of each of the high-frequency signals, or for controlling the level of each of the high-frequency signals mixed together by making use of a logic circuit and an attenuator has heretofore been performed to avoid variations in the degree of modulation of the light according to each frequency under the influence of high-frequency signals represented by other frequencies.

However, the above-described conventional light modulating apparatus simply controls the level of each of the already-mixed high-frequency signals. Therefore, the level, i.e., amplitude of each of the high-frequency signals generated from the oscillation circuits can be adjusted separately, and the accuracy in oscillations of each oscillation circuit varies due to errors in setting frequencies caused upon manufacture, so that the level of each of all the high-frequency signals cannot be rendered constant Thus, the conventional light modulating apparatus has the problem that the degrees of modulation of the light differ from each other owing to the difference in amplitude between outputs from the oscillation circuits, which is caused by variations in the accuracy of the oscillations of each oscillation circuit at the time that it is employed in recording of an image, thereby causing the nonuniformity of the density of the recorded image.

SUMMARY OF THE INVENTION

With the foregoing problems in view, it is a first object of the present invention to provide a method of inputting signals to a light modulator capable of suppressing the influence of third-order harmonic distortion on the same to the utmost.

It is a second object of the present invention to provide a simultaneous multi-beam type light modulating apparatus capable of suppressing the influence of third-order harmonic distortion on signals and correcting the nonuniformity of the density of an image, which is caused by the difference in amplitude between adjacent high-frequency signals produced from respective oscillation circuits.

In order to achieve the above first object, there is provided a method of mixing together a plurality of inputted signals whose frequency intervals are equal to each other so as to input the thus-mixed signals to a light modulator for dividing incident light beams with the intensity or level according to the amplitude of each of the plurality of signals and in the direction corresponding to the frequency of each of the plurality of signals, thereby radiating the so-divided light beams, the method comprising the steps of:

combining the plurality of signals into a plurality of groups in such a manner that at least two signals out of the plurality of signals are included in one group out of the plurality of groups and signals free from being adjacent to each other at the time that the plurality of signals are arranged in order of frequency are included in the same groups;

mixing signals in the respective groups together; and further mixing the thus-mixed signals together so as to be inputted to the light modulator.

It is preferable to set the intervals between adjacent frequencies of the signals free from being adjacent to each other so as to be equal to each other. It is further desired that the intervals between the adjacent frequencies thereof are set equal to each other and to be the maximum.

According to the present invention, the plurality of signals whose frequencies differ from each other and whose frequency intervals are equal to each other, are combined into the plurality of groups in such a way that said at least two signals are included in said one group. The plurality of signals are combined into the plurality of groups in such a manner that only the signals free from being adjacent to each other are included in the same groups when the plurality of signals are arranged in order of frequency. Then, the signals in the respective groups are mixed together, and the thus-mixed signals are further mixed together. Further, the thus finally-mixed signals are inputted to the light modulator for dividing the incident light beams with the intensity or level according to the amplitude of each of the inputted signals and in the direction corresponding to the frequency of each of the inputted signals so as to radiate the thus-divided light beams therefrom.

Assuming that a plurality of signals are high-frequency signals whose frequencies are f, $f+\Delta$, $f+\Delta f$, $f+2\Delta f$, ..., $f+n\Delta f$ (f: reference frequency, $\Delta f$: frequency interval, and n: integer), frequencies of third-order harmonic signals at the time that adjacent high-frequency signals are mixed together are $f-\Delta f$, f, $f+\Delta f$, ..., $f+(n+1)\Delta f$. As a consequence, the frequencies of the third-order harmonic signals are produced at the same position as that where the frequencies of the high-frequency signals are present, and also produced at positions away from the necessary bandwidth $f \sim f+n\Delta f$ by a frequency interval $\Delta f$. Thus, since the third-order harmonic signals are produced for every frequency intervals, third-order harmonic signals produced at the time that high-frequency signals free from being adjacent to each other are mixed together are also produced at positions separated by intervals between adjacent frequencies of the high-frequency signals free from being adjacent to each other. Since the intervals between the adjacent frequencies of the high-frequency signals free from being adjacent to each other are greater than those between adjacent frequencies of high-frequency signals adjacent to each other, the third-order harmonic signals generated at the time that the high-frequency signals free from being adjacent to each other are mixed together are produced over a band wider than that of third-order harmonic signals produced at the time that the high-frequency signals adjacent to each other are mixed together. Accordingly, the number of the third-order harmonic signals, which exist within the necessary frequency band at the time that the high-frequency signals free from being adjacent to each other are mixed together, are smaller than that of the third-order harmonic signals produced at the time that the high-frequency signals adjacent to each other are mixed together, thereby making it possible to reduce the level of each of the third-order harmonic signals which exist within the necessary band. In addition, third-order harmonic signals existing outside the necessary frequency band can be eliminated by means of a filter. According to the present invention, as described above, the level of each of the third-order harmonic signals existing within the necessary frequency band can be reduced. It is therefore possible to suppress the influence of the third-order harmonic signals on the high-frequency signals to the utmost, and to avoid the nonuniformity of the density of a recorded image.

If the intervals between the adjacent frequencies of the high-frequency signals free from being adjacent to each other are set equal to each other, the third-order harmonic signals are produced in an equally dispersed manner. It is therefore possible to prevent the level of each of the third-order harmonic signals from being partly raised. If the intervals between the adjacent frequencies of the high-frequency signals free from being adjacent to each other are set to be equal to each other and to be the maximum, the third-order harmonic signals are produced over the widest frequency band in an equally dispersed manner. It is therefore possible to set the third-order harmonic signals to the same levels and minimize the level of each third-order harmonic signal. If the high-frequency signals are divided as represented in the form of $f_1, f_2, f_3, \ldots, f_n$ (n is an even number) by way of example in such a manner that two signals are included in one group as represented in the form of $(f_1, f_{(n+2)/2})$, $(f_2, f_{(n+4)/2})$, $(f_3, f_{(n+6)/2})$, ..., $(f_{n/2}, f_n)$, the intervals between adjacent frequencies of high-frequency signals free from being adjacent to each other become equal to each other and reach the maximum.

As has been described above, the present invention can bring about advantageous effects that since the signals are divided into the plurality of groups in such a manner that only the signals free from being adjacent to each other are included in the same groups and the signals in the respective groups are mixed together, the influence of the harmonic distortion on the signals can be reduced to the utmost and the nonuniformity of the density of the recorded image can be prevented from being produced.

According to the present invention, there is provided the method further comprising the step of controlling the amplitude of each of a plurality of signals in such a manner that when the plurality of signals are inputted one by one, the power levels of light beams emitted from a light modulator are set equal to each other, and each of the power levels of a plurality of light beams emitted from the light modulator at the time that the plurality of signals are inputted to be mixed together is set equal to the power level of a light beam emitted from the light modulator at the time that the plurality of signals are inputted one by one.

Thus, the power levels of the light beams emitted from the light modulator at the time that the respective signals are inputted are set equal to each other and the power levels of the plurality of light beams emitted from the light modulator when the plurality of signals are applied simultaneously are set to be equal to the power levels mentioned above. Therefore, the power of a single light beam can be maintained at the constant level at all times in spite of the frequencies and the number of the inputted signals, thereby making it possible to correct the nonuniformity of the density of the image.

In order to achieve the above second object, the simultaneous multi-beam type light modulating apparatus according the present invention comprises:

a plurality of oscillating means for generating signals whose frequencies differ from each other at equal frequency intervals;

a plurality of series means electrically connected to each of the plurality of oscillating means and for electrically connecting each of first level control means each used to control the amplitude of each of the signals generated from the plurality of oscillating means to each of switching means which are turned on or off based on image data;

a plurality of first mixing means for mixing together signals outputted from the plurality of series means every groups combined in such a manner that at least two signals are included in one group and signals free from being adjacent to each other at the time that the signals outputted from the plurality of series means are arranged in order of frequency are included in the same groups;

second mixing means for mixing signals outputted from the plurality of first mixing means together into one;

light modulating means for dividing light beams incident with the intensity or level according to the amplitude of each of signals outputted from the second mixing means and in the direction corresponding to the frequency of each of the signals to thereby radiate the thus-divided light beams therefrom; and at least one second level control means for controlling the amplitude of each of the signals mixed with either one of the plurality of first mixing means or the second mixing means.

Since the plurality of series means are electrically connected to the oscillating means respectively, the amplitude of each of the signals generated from the oscillating means can separately be controlled by each of the first level control means. As a consequence, the amplitude of each of the signals generated from the oscillating means can be set to be equal to each other. Further, the second level control means serves to control the amplitude of each of the mixed signals. It is therefore possible to avoid the occurrence of nonuniformity of the density of an image, which is caused when the signals whose frequencies differ from each other are simultaneously inputted to the light modulating means.

In order to achieve the above second object, there is further provided a simultaneous multi-beam type light modulating apparatus according to the present invention, which comprises:

a plurality of oscillating means for generating signals whose frequencies differ from each other at equal frequency intervals;

a plurality of series means electrically connected to each of the plurality of oscillating means and for electrically connecting each of level control means each used to control the amplitude of the signals generated from the plurality of oscillating means in response to each inputted control signal, to each of switching means which are turned on or off based on image data;

inputting means for inputting, as a control signal, the sum of a signal for separately controlling the amplitude of each of the signals generated from the plurality of oscillating means and a signal for equally controlling the amplitude thereof, to each of the level control means;

first mixing means for mixing together signals outputted from the plurality of series means every groups divided in such a manner that at least two signals are included in one group and signals free from being adjacent to each other at the time that the signals outputted from the plurality of series means are arranged in order of frequency are included in the same groups;

second mixing means for mixing signals outputted from the first mixing means together into one; and light modulating means for dividing light beams incident with the intensity or level according to the amplitude of each of signals outputted from the second mixing means and in the direction corresponding to the frequency of each of the signals to thereby radiate the thus-divided light beams therefrom.

The simultaneous multi-beam type light modulating apparatus is provided with the level control means each having the functions of both the first level control means and the second level control means. It is therefore possible to avoid the nonuniformity of the density of the image, which is caused by the difference in amplitude between the outputs from the oscillating means and the nonuniformity of the density of the image, which is caused by variations in the number of the inputted signals, by simplifying the structure of the apparatus.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIGS. 7(1) through 7(4) are diagrams each for describing the influence of a third-order harmonic signal on a signal produced from an oscillator;

FIGS. 8(1) through 8(4) are diagrams each for describing the influence of a third-order harmonic signal on a signal outputted from an oscillator employed in the present embodiment;

DETAILED DESCRIPTION OF THE PREFERRED EMBODIMENTS

Figure 2:
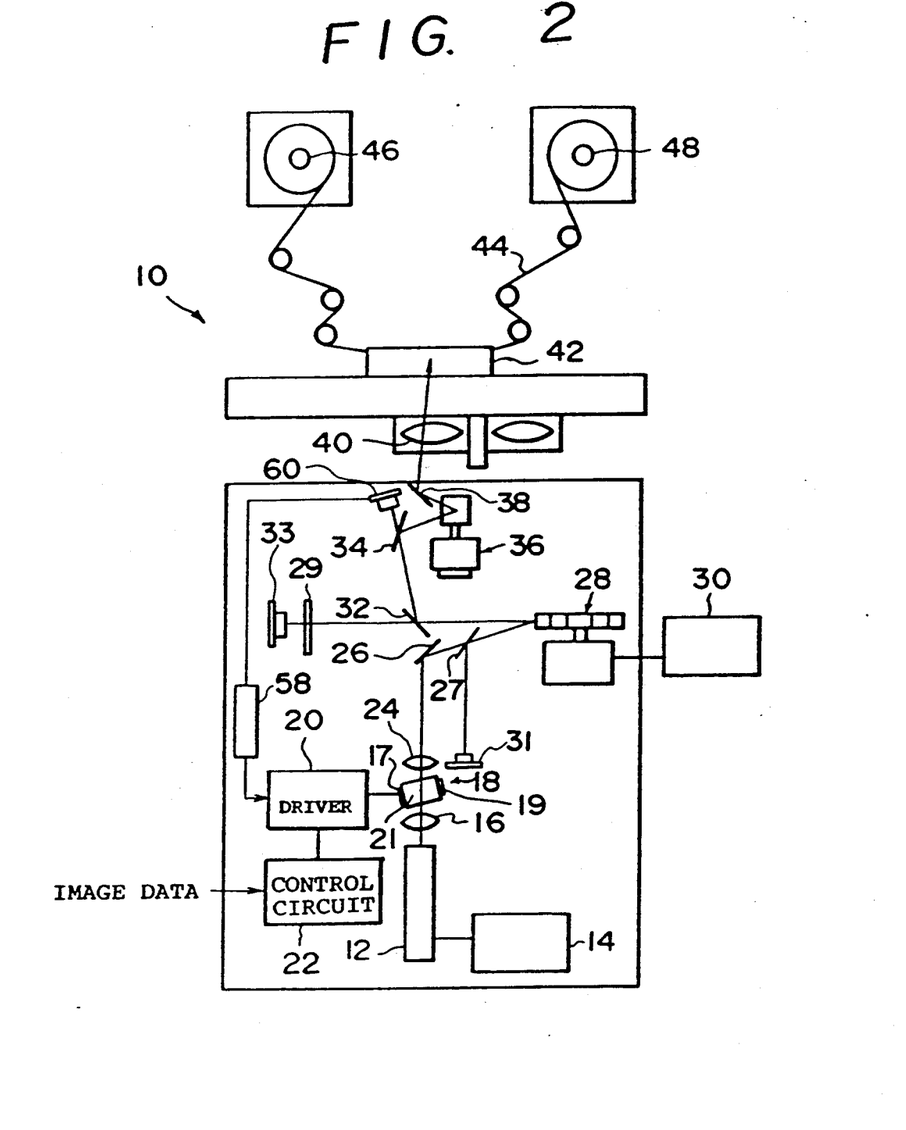
FIG. 2 is a schematic diagram depicting a laser beam recording apparatus to which the present invention is applied.

A preferred embodiment of the present invention will hereinafter be described in detail with reference to the accompanying drawings. FIG. 2 shows a laser beam recording apparatus to which a concurrent or simultaneous multi-beam type light modulating apparatus employed in the present embodiment is applied. A power supply 14 is electrically connected to an He-Ne type laser 12 used to oscillate or generate a recording laser beam. A lens 16, a multi-frequency AOM (which corresponds to an Acousto-Optic Device, and this multifrequency AOM will hereinafter be referred to as "AOM") 18, and a lens 24 are arranged in order on an emission side of a laser beam from the He-Ne laser 12. The AOM 18 is provided with an acoustic optical medium 21 used to cause an acousto-optic effect. A transducer 17 for outputting a supersonic wave according to an inputted high-frequency signal and an acoustic absorber 19 used to absorb a supersonic wave propagated through the acoustic optical medium 21 are mounted on their opposed surfaces of the acoustic optical medium 21. The transducer 17 is electrically connected to an AOM driver 20 for driving the AOM 18, which is in turn connected to a control circuit 22. A mirror 26, a wave-combining means 27 such as a dichroic mirror, etc., a polygon mirror 28, a wave-branching means 32 such as a dichroic mirror, etc., a mirror 34 used to transmit a part of a laser beam therethrough, a galvanometric mirror 36, and a mirror 38 used to transmit a part of a laser beam therethrough are arranged in order on a laser-beam emission side of the lens 24.

The wave-combining means 27 is incident with a synchronizing laser beam oscillated or generated from a semiconductor laser 31 so as to be combined with a recording laser beam generated from the He-Ne laser 12. The thus-combined laser beam is incident upon the wavebranching means 32 through the polygon mirror 28, and thereafter is separated into the synchronizing laser beam and the recording laser beam by the wavebranching means 32. A linear encoder 29 having transparent portions and opaque portions alternately arranged in large numbers, and a photodiode 33 for converting a laser beam transmitted through the linear encoder 29 into an electric signal to output a synchronizing signal are arranged in order in a forward direction of the synchronizing laser beam separated by the wave-branching means 32. The polygon mirror 28 is electrically connected to a polygon mirror 30 used to rotate the polygon mirror 28 at high speed. In addition, a photodiode 60 for detecting the intensity of the recording laser beam is disposed in a position where a laser beam transmitted through the mirror 34 can be received. The laser beam reflected from the mirror 3 is radiated on a stage 42 through a write lens 40. A recording material 44 such as a microfilm, etc. is mounted on the stage 42. The recording material 44 is wound on each of reels 46 and 48 in the form of a layer.

Figure 1:
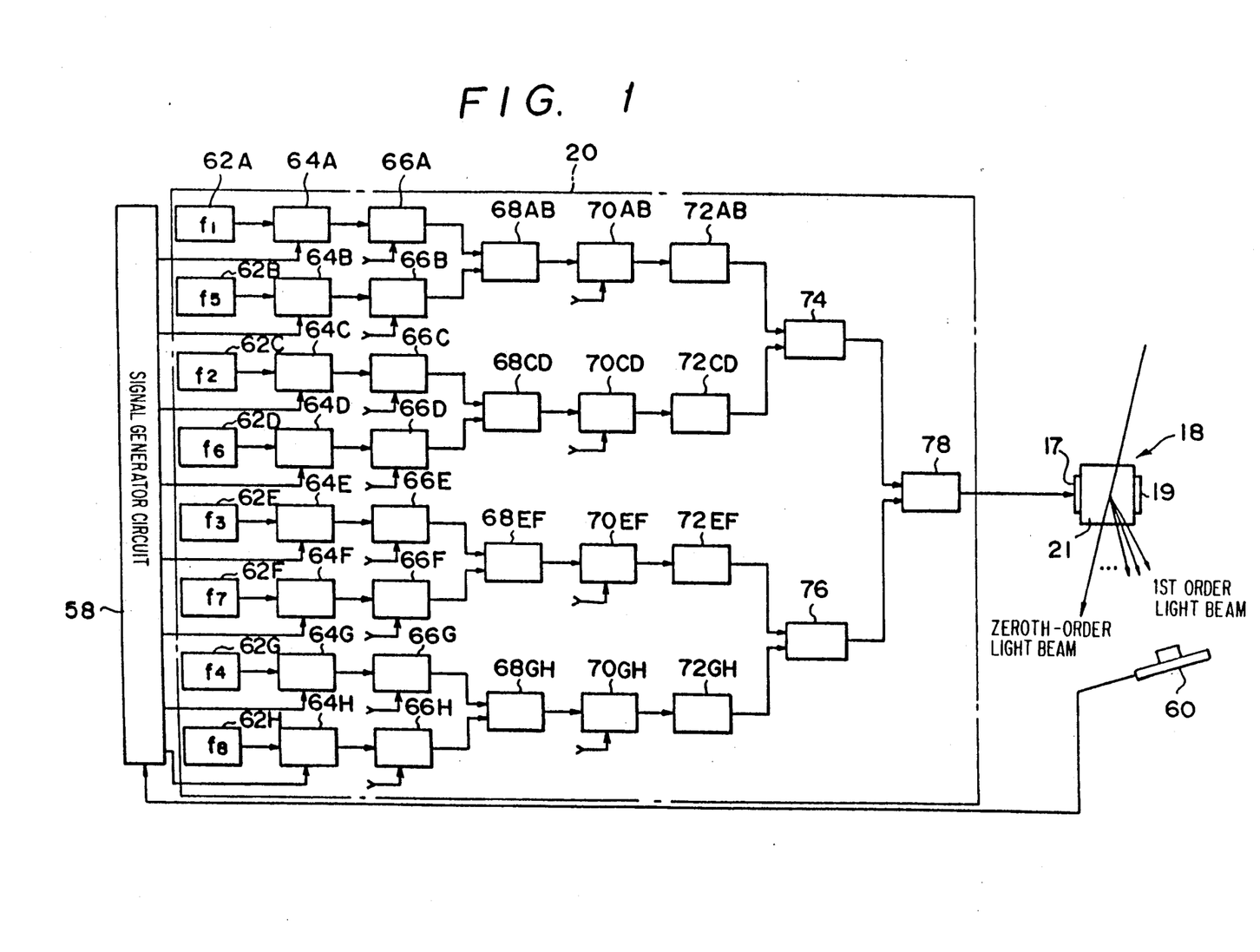
FIG. 1 is a block diagram showing an AOM driver according to one embodiment of the present invention.
Figure 3:
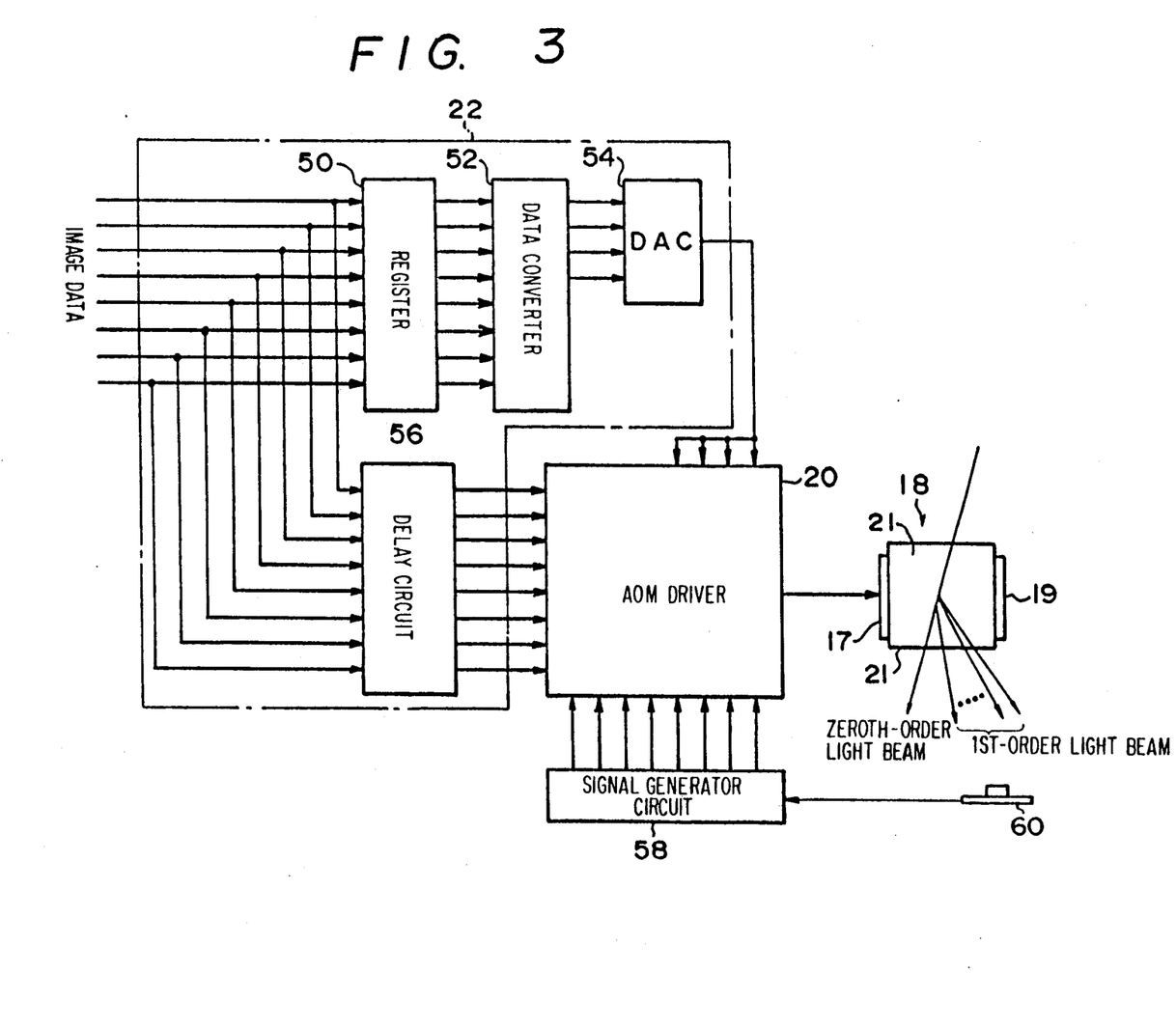
FIG. 3 is a block diagram showing details of a control circuit employed in the above-described embodiment.

As shown in FIG. 3, the photodiode 60 used to output the voltage having the level according to the intensity of a received laser beam is electrically connected to a signal generator circuit 58 used to output a signal for separately controlling the amplitude of each of signals produced from an oscillation circuit (see FIG. 1). The signal generator circuit 58 is electrically connected to the AOM driver 20.

Figure 5:
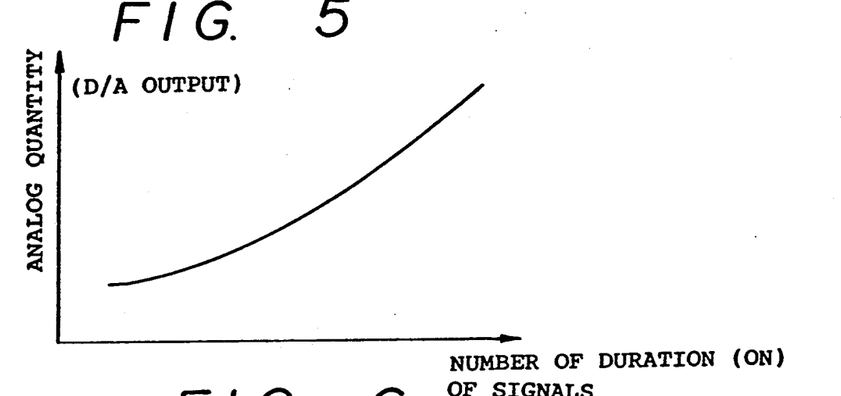
FIG. 5 is a diagram for describing the relationship between the number of the duration (ON) of image data and the level of each of analog signals outputted from a DAC.

The control circuit 22 comprises a register 50 used to temporarily store therein image data, and a data converter 52 electrically connected to the register 50. The image data are given in the form of a 8-bit parallel signal. The data converter 52 outputs a 4-bit parallel signal according to the number of the duration (ON) of a 8-bit signal inputted from the register 50. A DAC (Digital-Analog Converter) 54 is electrically connected to the data converter 52. The DAC 54 serves to convert a 4-bit parallel signal outputted from the data converter 52 into an analog signal so as to output the thus-converted signal to the AOM driver 20 as a control signal for controlling in such a manner that the amplitudes of signals produced from the oscillation circuits are identical to each other. The level of the so-converted analog signal is increased as the number of the duration (ON) of the signal is increased as shown in FIG. 5. The image data are inputted to the AOM driver 20 after they are delayed a predetermined period of time in a delay circuit 56.

The AOM driver 20 comprises oscillation circuits 62A, 62B, 62C, 62D, 62E, 62F, 62G, 62H, local level control circuits 64A, 64B, 64C, 64D, 64E, 64F, 64G, 64H, and switching circuits 66A, 66B, 66C, 66D, 66E, 66F, 66G, 66H, as shown in FIG. 1. The local level control circuits 64A to 64H are electrically connected to outputs of the oscillation circuits 62A to 62H, respectively, whereas the switching' circuits 66A to 66H are electrically connected to outputs of the local level control circuits 64A to 64H respectively. As the local level control circuit, can be used a doublebalanced mixer or a pin diode attenuator. The signal . generator circuit 58 is electrically connected to each of level control terminals of the switching circuits 64A to 64H. In addition, the delay circuit 56 is electrically connected to each of control terminals of the switching circuits 66A to 66H in such a manner that each of image data outputted from the delay circuit 56 is inputted thereto.

In addition, respective outputs of the switching circuits 66A and 66B are electrically connected to inputs, respectively, of a combiner 68AB for mixing two signals together in a 1:1 ratio. Similarly, respective outputs of the switching circuits 66C, 66D are electrically connected to inputs, respectively, of a combiner 68CD. Further, respective outputs of the switching circuits 66E, 66F are electrically connected to inputs, respectively, of a combiner 68EF, whereas respective outputs of 66G, 66H are electrically coupled to inputs, respectively, of a combiner 68GH.

An output of the combiner 68AB is electrically connected to an amplifying circuit 72AB through a total level control circuit 70AB. Similarly, an output of the combiner 68CD is electrically connected to an amplifying circuit 72CD through a total level control circuit 70CD. Further, an output of the combiner 68EF is electrically connected to an amplifying circuit 72EF through a total level control circuit 70EF, whereas an output of the combiner 68GH is electrically coupled, to an amplifying circuit 72GH through a total level control circuit 70GH. Respective outputs of the amplifying circuits 72AB and 72CD are electrically connected to inputs, respectively, of a combiner 74, whereas respective outputs of the amplifying circuits 72EF and 72GH are electrically coupled to inputs, respectively of a combiner 76. Further, outputs of the combiners 74 and 76 are electrically connected to a combiner 78, and an output of the combiner 78 is electrically connected to the transducer 17. As each of the total level control circuits, may be used either the double-balanced mixer or the pin diode attenuator in the same manner as each of the local level control circuits. An output of the DAC 54 in the control circuit 22 is electrically connected to each of the level control terminals of the total level control circuits.

In the present embodiment, two signals whose frequencies are not adjacent to each other are combined together in such a manner that their frequency intervals are equal to each other and set to the maximum. After the two signals are mixed together, they are mixed so as to be finally a single signal. More specifically, as shown in FIG. 1, the oscillation circuit 62A for generating a signal of a frequency $f_1$ is combined with the oscillation circuit 62B for generating a signal of a frequency $f_5$, and signals generated from the oscillation circuits 62A and 62B are mixed together by the combiner 68AB. Similarly, the combiner 68CD serves to mix signals of frequencies $f_2$ and $f_6$ together, and the combiner 68EF serves to mix together signals of frequencies $f_3$ and $f_7$. In addition, the combiner 68GH mixes together signals of frequencies $f_4$ and $f_8$.

Thus, let's now consider the frequencies $f_1$ and $f_5$. As shown in FIG. 8(1), a third-order harmonic signal is produced at a position where a frequency $2f_5-f_1$ sufficiently away from a position where the frequency $f_5$ is present appears, and also produced at a position where a frequency $2f_1-f_5$ sufficiently away from a position of presence of the frequency $f_1$ appears. Similarly, the third-order harmonic signal is produced at each of frequencies $2f_2-f_6$ and $2f_6-f_2$ sufficiently away from the frequencies $f_2$ and $f_6$, respectively. Consequently, when all the frequencies $f_1, f_2, \ldots f_8$ are mixed together, the third-order harmonic signals are dispersed over a wide frequency band as shown in FIG. 8(3), thereby reducing the level of each of the third-order harmonic signals. Third-order harmonic signals produced at the frequency range other than that of $f_1$ to $f_8$ can be eliminated by a filter. Since the third-order harmonic signals which exist within the frequency range of $f_1$ to $f_8$ are low in level, they exert but slight influence over the frequencies $f_1, f_2, \ldots, f_8$. It is therefore possible to extremely reduce the influence of harmonic signals on a space (OFF) signal even when one image data is in a space state (OFF).

Incidentally, the two signals whose frequencies are not adjacent to each other are combined together in such a way that their frequency intervals are equal to each other and set to the maximum in the above-described embodiment. However, the frequency intervals may not be set to be equal to each other and to be the maximum.

A description will hereinafter be made of the operation of the present embodiment. 8-bit image data supplied from a host computer or the like are supplied to the register 50 and the delay circuit 56. The data converter 52 outputs a digital signal according to the number of the duration (ON) of signals inputted from the register 50, and the DAC 54 outputs an analog signal shown in FIG. 5 according to the so-outputted digital signal. The analog signal thus outputted is supplied to each of the control terminals of the total level control circuits 70AB to 70GH. Then, image data delayed a predetermined period of time by the delay circuit 56 are inputted to the switching circuits 66A to 66H, respectively, of the AOM driver 20. In addition, the amplitude of each of signals outputted from the oscillation circuits 62A to 62H is adjusted and controlled by each of the local level control circuits 64A to 64H. Thereafter, the signals whose amplitudes have been processed as described above are supplied to the transducer 17 of the AOM 18 through the switching circuits 66A to 66H, the combiners 68AB to 68GH, the total level control circuits 70AB to 70GH, the amplifying circuits 72AB to 72GH, the combiners 74, 76, and the combiner 78. The transducer 17 serves to convert each of the signals inputted thereto into a supersonic signal according to the frequency and the amplitude of each of the inputted signals. Then, the supersonic signal is propagated through the acoustic optical medium 21 so as to be absorbed by the acoustic absorber 19. When a laser beam is generated from the He-Ne laser 12 at this time, it is divided with the intensity or level according to the amplitude of the supersonic signal and in a direction corresponding to the frequency thereof. Multi-divided laser beams are scanned in a main scanning direction by the polygon mirror 28 and scanned in an auxiliary scanning direction by the galvanometric mirror 36.

Figure 9:
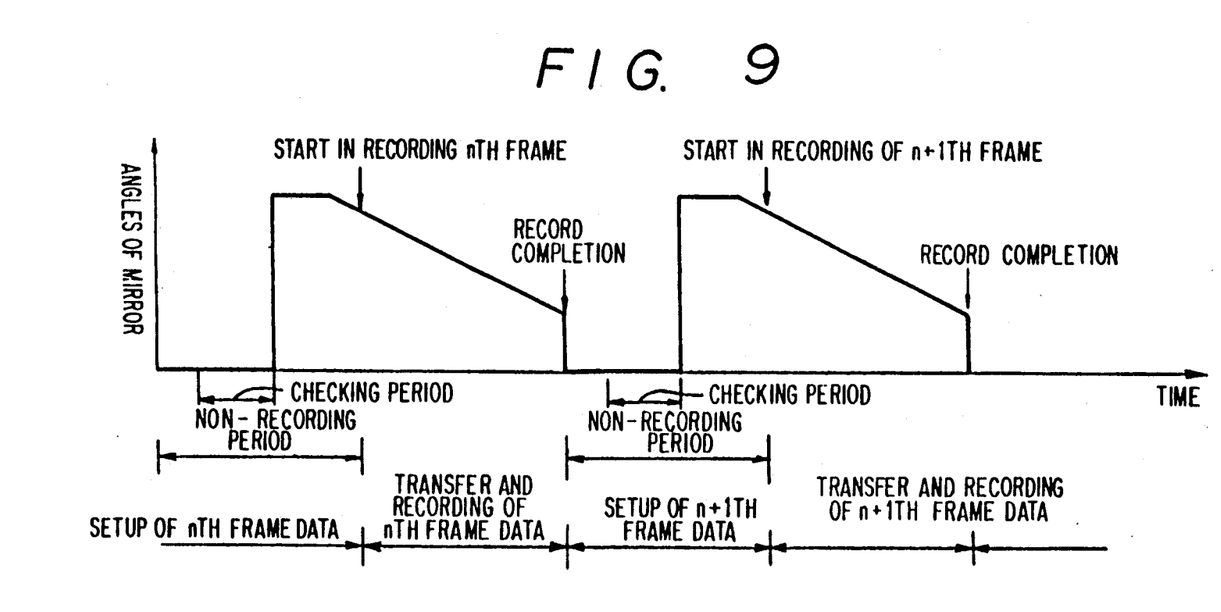
FIG. 9 is a diagram for describing the relationship among a data checking period, a data nonrecording period and a data recording period with respect to angles of a movable mirror of a galvanometer.

FIG. 9 shows angles of the galvanometric mirror 36 corresponding to the elapsed time. During a nonrecording period prior to a start in the recording of a nth frame, image data of the nth frame is prepared, and a recording material is fed by one frame so as to be positioned. When the recording of the nth frame is started, the transfer of the image data of the nth frame is made until the angle of the galvanometric mirror 36 reaches a recording completion angle, so that an image of the nth frame is recorded. During a checking period out of the non-recording period, the adjustment of the amplitude, i.e., the level of each of the signals generated from the oscillation circuits 62A to 62H is carried out. In this time, a laser beam emitted from the AOM 18 is reflected by the galvanometric mirror 36 in the direction of the photodiode 60 which is not positioned on a recording optical path. The above-described level adjustment is performed in the following manner. Namely, a constant voltage is applied to each of the level control terminals of the total level control circuits 70AB to 70GH so as to adjust the level of each signal outputted from each of the oscillation circuits 62A to 62H for every oscillation circuits of 62A to 62H. More specifically, the switching circuit 66A is only set to an on state in a state in which the signals are outputted from the oscillation circuits 62A to 62H. Then, the signal produced from the oscillation circuit 62A is supplied to the transducer 17 through the local level control circuit 64A, the switching circuit 66A, the combiner 68AB, the total level control circuit 70AB, the amplifying circuit 72AB, etc. Thus, the AOM 18 emits a laser beam having the intensity or level according to the amplitude of the signal outputted from the oscillation circuit 62A. The laser beam radiated from the AOM 18 is received by the photodiode 60, from which an electric signal corresponding to the intensity of the so-received laser beam is outputted. Then, the signal generator circuit 58 compares the level of a predetermined reference value and the level of a signal inputted from the photodiode 60. When the level of the inputted signal is greater than that of the reference value, the signal generator circuit 58 reduces a voltage applied across the control terminal of the local level control circuit 64A and controls so as to reduce the amplitude of the inputted signal. On the other hand, when the level of the inputted signal is smaller than that of the reference value, the oscillation circuit 58 serves to raise the voltage applied across the control terminal of the local level control circuit 64A and to control so as to increase the amplitude of the inputted signal. As a result, the intensity of one laser beam radiated from the AOM 18 is adjusted so as to be a target value. Then, the switching circuits 66B to 66H are turned on in order, and the level adjustment of each of signals produced from the oscillation circuits 62B, ...., 62H is performed in the same manner as described above. During a checking period of the signal level, the level adjustment of signals from all the oscillation circuits 62A to 62H is made. When an image is being recorded, the signal generator circuit 58 serves to hold the value of the voltage thus adjusted.

Figure 4:
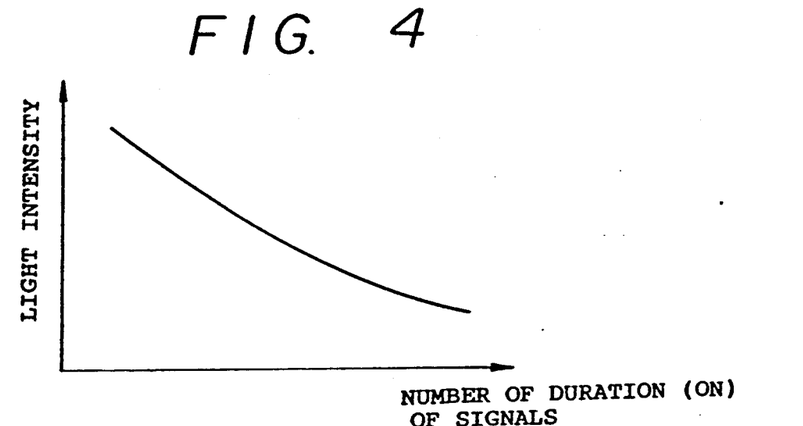
FIG. 4 is a diagram for describing the relationship between the number of the duration (ON) of image data and the intensity of a laser beam.
Figure 6:
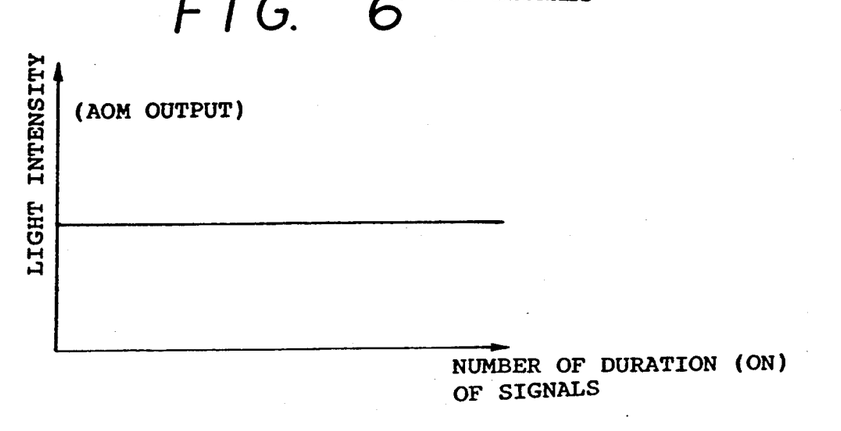
FIG. 6 is a diagram for describing the relationship between the number of the duration (ON) of image data and the intensity of a laser beam.
Figure 7:
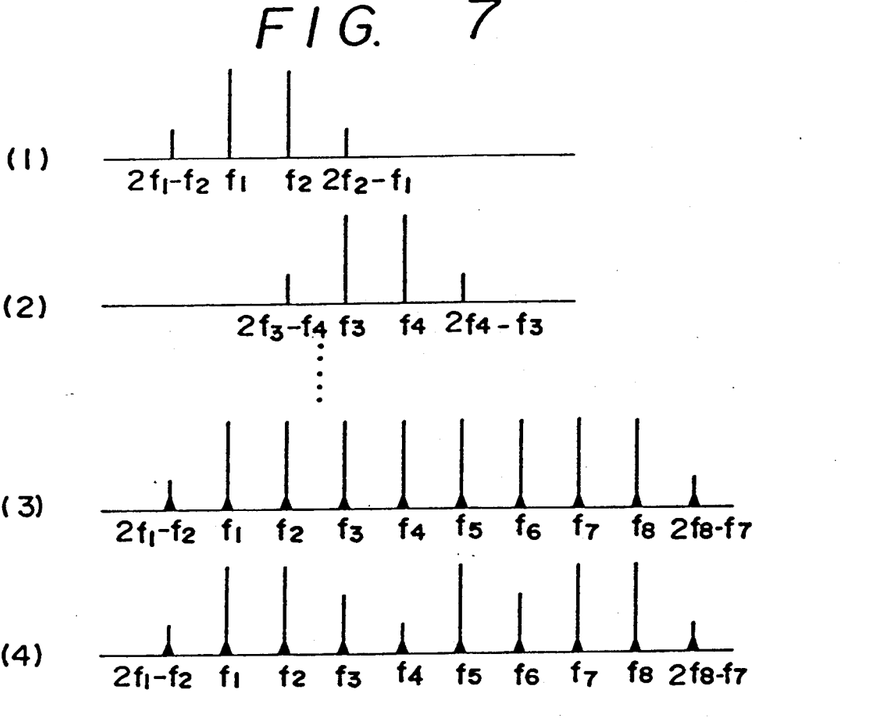
Figure 8:
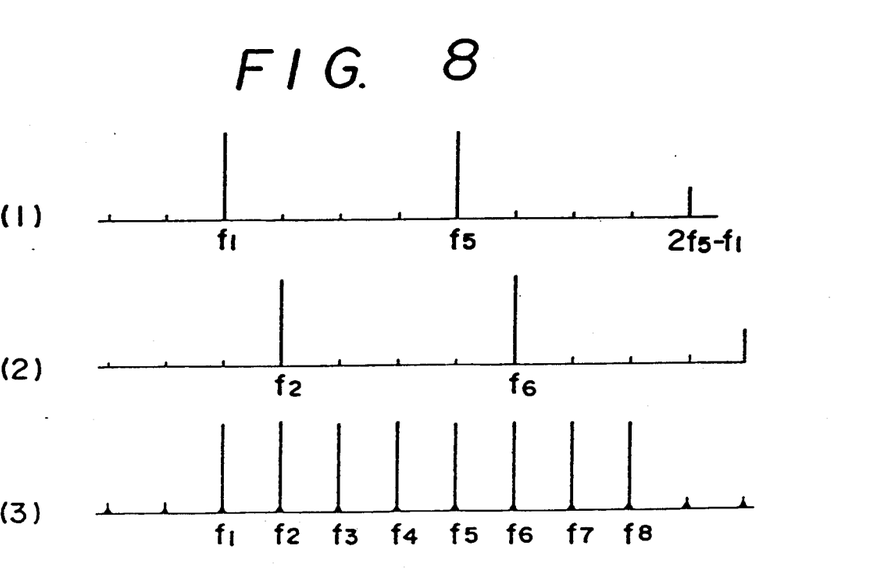

When the image data of the nth frame is being recorded, an analog signal proportional to the number of the duration (ON) of image data shown in FIG. 5 is supplied to each of the total level control circuits 70AB, 70CD, 70EF and 70GH by means of the register 50, the data converter 52 and the DAC 54. Then, each of the total level control circuits 70AB, 70CD, 70EF, 70GH controls the amplitude of each of signals outputted from the combiners 68AB to 68GH according to the analog signal referred to above. As a consequence, the optical intensity of each laser beam outputted from the AOM 18 is kept constant in spite of the number of the duration (ON) of the inputted signal as illustrated in FIG. 6, thereby making it possible to avoid the occurrence of nonuniformity of the density of an image, which is caused by variations in the number of the duration (ON) of the image data. Incidentally, when the amplitude of the inputted signal is not controlled based on the number of the duration (ON) of the signal, the intensity of one laser beam radiated from the AOM 18 is varied according to the number of laser beams radiated simultaneously, i.e., the number of the duration (ON) of the image data, as shown in FIG. 4.

Incidentally, the above-described embodiment has shown and described one example in which the total level control circuits are electrically connected to the stages subsequent to the combiners 68AB to 68GH each used to mix the two signals together. However, the total level control circuits may electrically be connected to stages subsequent to the combiners 74, 76 or to a stage subsequent to the combiner 78.

According to the present embodiment, as has been described above, the first level control circuits are electrically connected to the oscillation circuits respectively. In addition, the second level control circuits for controlling the amplitude of each of the signals outputted from the combiners are provided. Therefore, the present invention can bring about advantageous effects that the amplitudes of the signals produced from the oscillation circuits can be set equal to each other, and variations in the intensity or degree of modulation of the light, which are caused at the time that the signals whose frequencies differ from each other are supplied to a light modulator simultaneously, can be prevented, thereby making it possible to avoid the occurrence of nonuniformity of the density of the recorded image.

A description will now be made of another embodiment of the present invention. In the present embodiment, the functions of both the local level control circuit and the total level control circuit are realized by making use of an adder and a level control circuit.

Figure 10:
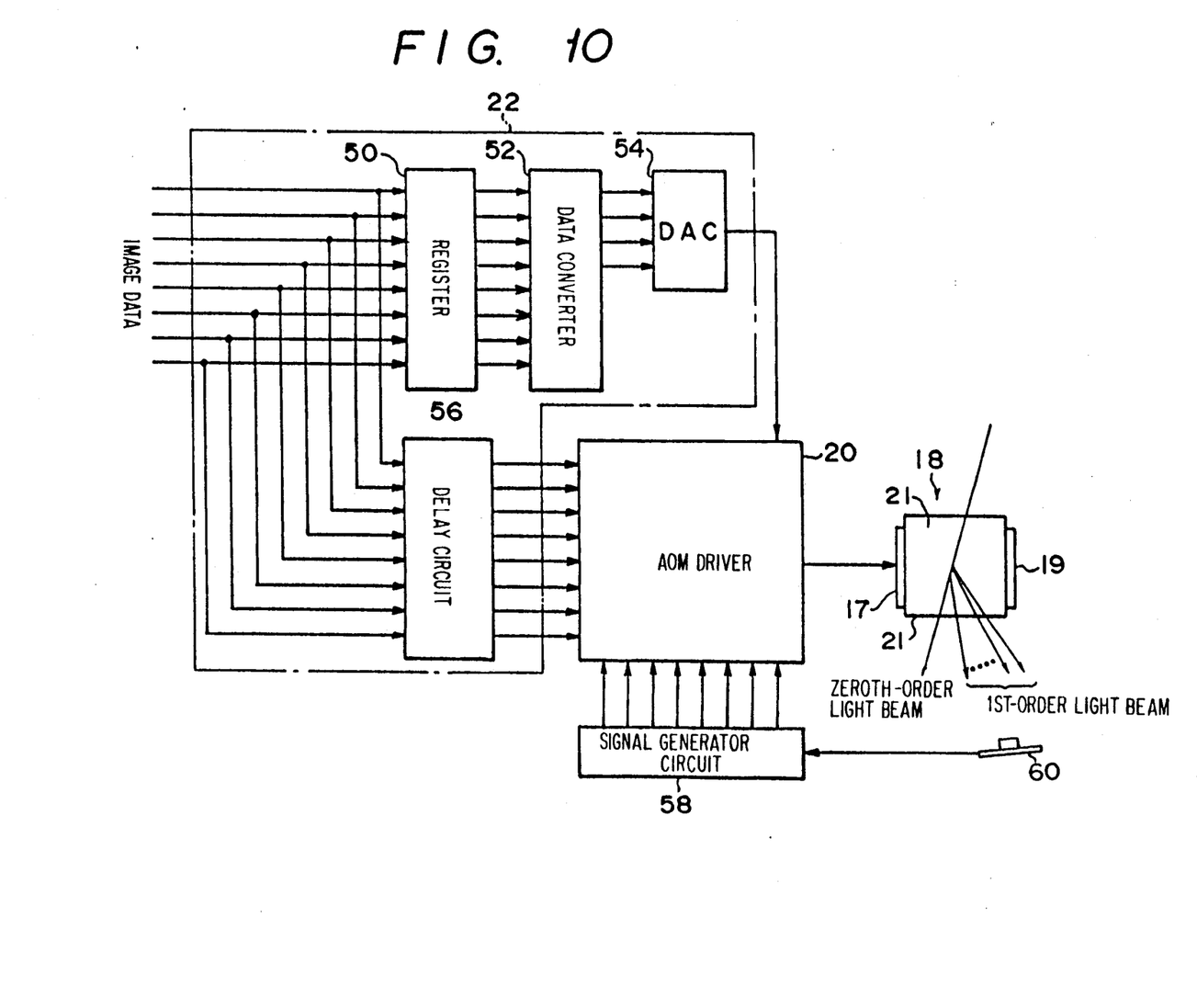
FIG. 10 is a block diagram showing details of a control circuit according to another embodiment of the present invention.
Figure 11:
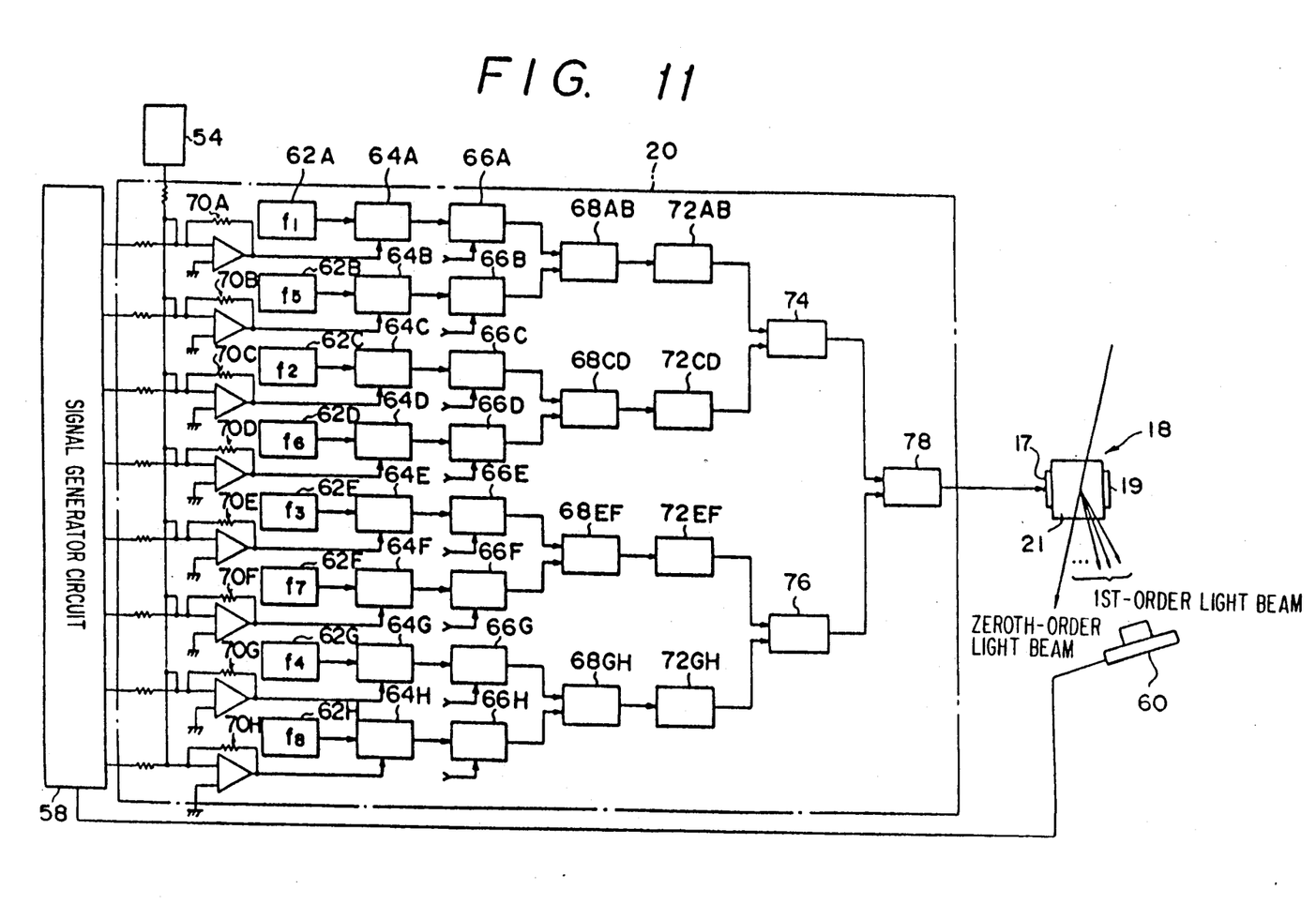
FIG. 11 is a block diagram depicting an AOM driver according to another embodiment of the present invention.

As shown in FIGS. 10 and 11, an output of an DAC 54 is electrically connected to an adder in an AOM driver 20.

As depicted in FIG. 11, the AOM driver 20 comprises oscillation circuits 62A, 62B, 62C, 62D, 62E, 62F, 62G, 62H, level control circuits 64A, 64B, 64C, 64D, 64E, 64F, 64G, 64H each for controlling the amplitude of each of signals produced from the oscillation circuits mentioned above according to each inputted control signal, and switching circuits 66A, 66B, 66C, 66D, 66E, 66F, 66G, 66H. Each of the level control circuits 64A to 64H is electrically connected to each of outputs of the oscillation circuits 62A to 62H. In addition, the switching circuits 66A to 66H are electrically connected in series to outputs of the level control circuits 64A to 64H, respectively, thereby forming a series circuit by one of the level control circuits and one of the switching circuits. As one level control circuit, may be used either a double-balanced mixer or a pin diode attenuator in the same manner as the above-described embodiment. In addition, adders 70A, 70B, 70C, 70D, 70E, 70F, 70G, 70H, each of which comprises an operational amplifier and a plurality of resistors, are electrically connected to level control terminals of the level control circuits 64A to 64H, respectively. Each of the adders 70A to 70H adds a signal outputted from the DAC 54 and a signal outputted from a signal generator 58 so as to apply the result of its addition to each of control terminals of the level control circuits 64A to 64H. Then, a delay circuit 56 is electrically connected to each of control terminals of the switching circuits 66A to 66H in such a manner that image data outputted from a delay circuit 56, i.e., each of 8-bit signals is inputted thereto.

In addition, respective outputs of the switching circuits 66A and 66B are electrically connected to inputs, respectively, of a combiner 68AB for mixing two signals together in a 1:1 ratio. Similarly, respective outputs of the switching circuits 66C, 66D are electrically connected to inputs, respectively, of a combiner 68CD. Further, respective outputs of the switching circuits 66E, 66F are electrically connected to inputs, respectively, of a combiner 68EF, whereas respective outputs of the switching circuits 66G, 66H are electrically coupled to inputs, respectively, of a combiner 68GH.

An output of the combiner 68AB is electrically connected to an amplifying circuit 72AB. Similarly, an output of the combiner 68CD is electrically connected to an amplifying circuit 72CD. Further, an output of the combiner 68EF is electrically connected to an amplifying circuit 72EF, whereas an output of the combiner 68GH is electrically coupled to an amplifying circuit 72GH. Respective outputs of the amplifying circuits 72AB and 72CD are electrically connected to inputs, respectively, of a combiner 74, whereas respective outputs of the amplifying circuits 72EF and 72GH are electrically coupled to inputs, respectively of a combiner 76. Further, outputs of the combiners 74 and 76 are electrically connected to a combiner 78 whose output is electrically connected to the transducer 17.

A description will hereinafter be made of the operation of the present embodiment. 8-bit image data supplied from a host computer or the like are supplied to a register 50 and the delay circuit 56. A data converter 52 outputs a digital signal according to the number of the duration (ON) of signals inputted from the register 50, and the DAC 54 outputs an analog signal shown in FIG. 5 according to the so-outputted digital signal. The analog signal thus outputted is supplied to one of inputs of each of the adders 70A to 70H. Then, image data delayed a predetermined period of time by the delay circuit 56 are inputted to the switching circuits 66A to 66H, respectively, of the AOM driver 20. In addition, each of the level control circuit 64A to 64H adjusts or controls the amplitude of each of signals outputted from the oscillation circuits 62A to 62H in response to each of control signals inputted from the adders 70A to 70H. Thereafter, the signals whose amplitudes have been adjusted as described above are supplied to the transducer 17 of the AOM 18 through the switching circuits 66A to 66H, the combiners 68AB to 68GH, the amplifying circuits 72AB to 72GH, the combiners 74, 76, and the combiner 78.

A description will now be made of a method for controlling the level of signals. During a checking period out of a non-recording period shown in FIG. 9, the adjustment of the amplitude, i.e., the level of each of the signals' produced from the oscillation circuits 62A to 62H is carried out. In this time, a part of a recording laser beam emitted from the AOM 18 is detected by a photodiode 60. The above-described level adjustment is performed in the following manner. Namely, the DAC 54 is kept so as not to output a signal, and the signal generator circuit 58 supplies a signal of a constant level to said one of the inputs of each of the adders 70A to 70H so as to apply a constant voltage to each of the level control circuits 64A to 64H, thereby adjusting the level of each signal outputted from each of the oscillation circuits 62A to 62H for every oscillation circuits of 62A to 62H. More specifically, only the switching circuit 66A is set to an on state in a state in which the signals are produced from the oscillation circuits 62A to 62H. Then, the signal generated from the oscillation circuit 62A is supplied to the transducer 17 through the level control circuit 64A, the switching circuit 66A, the combiner 68AB, the amplifying circuit 72AB, etc. Thus, the AOM 18 emits a laser beam having the intensity or level according to the amplitude of the signal produced from the oscillation circuit 62A. The laser beam radiated from the AOM 18 is photoelectrically received by the photodiode 60, from which an electric signal corresponding to the intensity of the so-received laser beam is outputted. Then, the signal generator circuit 58 compares the level of a predetermined reference value and the level of a signal inputted from the photodiode 60. When the level of the inputted signal is greater than that of the reference value, the signal generator circuit 58 reduces a voltage applied across the control terminal of the level control circuit 64A and controls so as to reduce the amplitude of a high-frequency signal. On the other hand, when the level of the inputted signal is lower than that of the reference value, the oscillation circuit 58 serves to raise the voltage applied across the control terminal of the level control circuit 64A, thereby controlling so as to increase the amplitude of the high-frequency signal. As a result, the intensity of one laser beam radiated from the AOM 18 is adjusted so as to be a target value. Then, the switching circuits 66B to 66H are turned on in order, and the level adjustment of each of signals produced from the oscillation circuits 62B, . . ., 62H is performed in the same manner as described above. During a checking period of the signal level, the level adjustment of signals from all the oscillation circuits 62A to 62H is made. When an image is being recorded, the signal generator circuit 58 serves to hold the value of the voltage thus adjusted therein.

When an image is being recorded based on the image data of the nth frame, an analog signal proportional to the number of the duration (ON) of image data shown in FIG. 5 is supplied simultaneously to the other of the inputs of each of the adders 70A to 70H by means of the register 50, the data converter 52 and the DAC 54. Thus, each of the level control circuits 64A to 64H controls the amplitude of each of signals outputted from the oscillation circuits 62A to 62H according to the sum of each of signals from the signal generator circuit 58 and the analog signal. As a consequence, the optical intensity of each laser beam outputted from the AOM 18 is kept constant in spite of the number of the duration (ON) of the inputted signal as illustrated in FIG. 6, thereby making it possible to avoid the occurrence of nonuniformity of the density of an image, which is caused by variations in the number of the duration (ON) of the image data. Incidentally, when the amplitude of the inputted signal is not controlled based on the number of the duration (ON) of the signal, the intensity of one laser beam radiated from the AOM 18 is varied according to the number of laser beams radiated simultaneously, i.e., the number of the duration (ON) of the image data, as shown in FIG. 4.

As described above, each of the signals outputted from the signal generator circuit 58 is added to each signal outputted from the DAC 54 in each of the adders 70A to 70H, to thereby input the result of its addition to each of the control terminals of the level control circuits 64A to 64H. Therefore, the level adjustment of each signal from each oscillation circuit and the level adjustment according to the number of the duration (ON) of the image signals are carried out in the form of a combination of one oscillation circuit and one level control circuit.

According to the present invention, as has been described above, the amplitude of each signal produced from each oscillation circuit is controlled based on the sum of the signal for separately controlling each amplitude and the signal for equally controlling each amplitude. The present invention can therefore bring about advantageous effects that the amplitudes of the signals from the oscillation circuits can be set equal to each other, and variations in the intensity or degree of modulation of the light, which are caused at the time that the signals whose frequencies differ from each other are supplied to the light modulator simultaneously can be prevented, thereby making it possible to avoid the occurrence of nonuniformity of the density of the recorded image while making the power of the laser beam used to write data indicative of one pixel constant.

In the above-described embodiments, the two combiners 74 and 78 are provided at a stage subsequent to the amplifying circuit 72AB. When one high-frequency signal passes through one combiner, the amplitude of the signal is theoretically reduced through 3 dB. Thus, when the two combiners are used, the amplitudes of the two high-frequency signals are reduced through 6 dB (¼). Since one combiner is provided at a stage prior to the amplifying circuit, it is necessary to amplify the high-frequency signal four times in order to avoid the influence of a third-order intermodulation product on the same. Assuming that a target power of a high-frequency signal corresponding to one laser beam is 125 mW, the power obtained by the expression, i.e., 125 mW×4×4=2 W is required in view of the reduction in the power by the two combiners and the four-time amplification for the prevention of the third-order intermodulation product. Thus, a 2W-type amplifying circuit may be used. This corresponds to ¼ the power required to amplify the high-frequency signals at a time after high-frequency signals are mixed together.

As described above, the amplifying circuit is electrically connected to a position for amplifying the two high-frequency signals at a time. Therefore, the intremodulation interference, specifically the influence of the third-order distortion intermodulation product on the two high-frequency signals can be avoided by making use of an amplifying circuit whose maximum output power is low.

A description has been made of the case where the amplifying circuit is electrically connected to the position for amplifying the two high-frequency signals in the above embodiment. However, a desired amplifying circuit may electrically be connected to each of the outputs of the switching circuits 66A to 66H so as to amplify high-frequency signals prior to their mixture. In this case, it is simply necessary to compensate for the reduction in the power caused by three-stage combiners. Therefore, the high-frequency signals may be amplified by 9 dB.

Incidentally, a description has been made of the case where each level control circuit is electrically connected to the stage prior to each switching circuit. However, it may electrically be connected to the stage subsequent to each switching circuit.

Each of the above-described embodiments has described where the multi-frequency acousto-optic device is used as the light modulator. However, an optical waveguide type modulator may be used as an alternative. In addition, as a recording medium, may be used a heatmode recording medium such as a silver-salt film, a laser-direct coding film (LDF), an optical magnetic recording medium, etc. As a light source, may be utilized a gas laser, a solid laser, a semiconductor laser as well as the He-Ne laser. The simultaneous multibeam type light modulating apparatus of the present invention can also be applied to an apparatus for employing a laser employed in a printer or the like in scanning to produce an image, thereby recording the same on a recording medium at high speed, and to a reading apparatus used to cause a laser beam to scan for image information (one visibly recorded on a microfilm, a silver-salt film, etc.) to thereby read an image.

Having now fully described the invention, it will be apparent to those skilled in the art that many changes and modifications can be made without departing from the spirit or scope of the invention as set forth herein.

What is claimed is:

1. A method of mixing together a plurality of inputted signals whose frequency intervals are equal to each other so as to input the thus-mixed signals to a light modulator for dividing incident light beams with the intensity or level according to the amplitude of each of said plurality of signals and in the direction corresponding to the frequency of each of said plurality of signals thereby radiating the so-divided light beams, said method comprising the steps of:

combining said plurality of signals into a plurality of groups in such a manner that at least two signals out of said plurality of signals are included in one group out of said plurality of groups, and signals not adjacent to each other at the time when said plurality of signals are arranged in order of frequency are included in the same groups;

mixing signals in the respective groups together; and further mixing the thus-mixed signals together so as to be inputted to said light modulator.

2. A method according to claim 1, wherein said plurality of signals are divided in such a manner that the intervals between adjacent frequencies of said signals adjacent to each other are equal to each other.

3. A method according to claim 1, wherein said plurality of signals are combined in such a manner that the intervals between the adjacent frequencies of said signals not adjacent to each other are equal to each other and set to the maximum.

4. A method according to claim 1, wherein when said plurality of signals are $f_1, f_2, f_3, \ldots, f_n$ (n is an even number), said signals are combined into a plurality of groups as represented in the form of the following expressions in such a manner that two signals are included in one group:

First group $f_1, f_{(n+2)/2}$
Second group $f_2, f_{(n+4)/2}$
Third group $f_3, f_{(n+6)/2}$
n/2th group $f_{n/2}, f_n$ 5. A method according to claim 1, further comprising the step of controlling the amplitude of each of said plurality of signals in such a manner that when said plurality of signals are inputted one by one, the power levels of light beams emitted from said light modulator are set equal to each other, and each of the power levels of a plurality of light beams emitted from said light modulator at the time that said plurality of signals are inputted to be mixed together is set equal to the power level of a light beam emitted from said light modulator at the time that said plurality of signals are inputted one by one.

6. A method according to claim 1, further comprising the steps of controlling the amplitude of each of said plurality of signals in such a manner that the power levels of the light beams emitted from said light modulator at the time that said plurality of signals are inputted one by one are set equal to each other; and thereafter controlling the amplitude of each of said plurality of signals in such a way that the power levels of said plurality of light beams emitted from said light modulator at the time that said plurality of signals are inputted to be mixed together are set equal to the power levels controlled in the preceding step, respectively.

7. A simultaneous multi-beam type light modulating apparatus comprising:

a plurality of oscillating means for generating signals whose frequencies differ from each other at equal frequency intervals;

a plurality of series means electrically connected to each of said plurality of oscillating means and for electrically connecting each of a plurality of first level control means each used to control the amplitude of each of the signals outputted from said plurality of oscillating means to each of a plurality of switching means which are turned on or off based on image data;

a plurality of first mixing means for mixing together signals outputted from said plurality of series means wherein each group is combined such that at least two signals are included in one group and signals not adjacent to each other at the time when said signals outputted from said plurality of series means are arranged in order of frequency are included in the same groups;

second mixing means for mixing signals outputted from said plurality of first mixing means together into one;

light modulating means, responsive to signals outputted by said second mixing means, for dividing light beams incident with the intensity or level according to the amplitude of each of said signals outputted from said second mixing means and in the direction corresponding to the frequency of each of said signals to thereby radiate the thus-divided light beams therefrom; and at least one second level control means for controlling the amplitude of each of the signals mixed with one of said plurality of first mixing means and said second mixing means.

8. A simultaneous multi-beam type light modulating apparatus according to claim 7, wherein said plurality of first mixing means comprises means for combining said signals such that the intervals between adjacent frequencies of said signals not adjacent to each other are set equal to each other.

9. A simultaneous multi-beam type light modulating apparatus according to claim 7, wherein said plurality of first mixing means comprises means for combining said signals such that the intervals between the adjacent frequencies of said signals not adjacent to each other are set equal to each other and to the maximum.

10. A simultaneously multi-beam type light modulating apparatus according to claim 7, wherein said plurality of first mixing means comprises means for combining said signals into a plurality of groups which are represented in the form of the following expressions, when said signals whose frequencies differ from each other are $f_1, f_2, f_3, \ldots, f_n$ (n is an even number), such that two signals are included in one group:

First group $f_1, f_{(n+2)/2}$
Second group $f_2, f_{(n+4)/2}$
Third group $f_3, f_{(n+6)/2}$
. .
. .
. .
n/2th group $f_{n/2}, f_n$ 11. A simultaneous multi-beam type light modulating apparatus according to claim 7, wherein each of said first level control means control the amplitude of each of the signals generated from said plurality of oscillating means such that the power levels of light beams emitted from said light modulating means are set equal to each other, when said signals are inputted one by one.

12. A simultaneous multi-beam type light modulating apparatus according to claim 7, wherein said at least one second level control means controls the amplitude of each of the signals mixed with one of said plurality of first mixing means and said second mixing means to be increased with an increase in the number of the signals to be mixed by said second mixing means.

13. A simultaneous multi-beam type light modulating apparatus according to claim 7, wherein said at least one second level control means controls the amplitude of each of the signals mixed with one of said plurality of first mixing means and said second mixing means such that each of the power levels of a plurality of light beams emitted from said light modulating means at the time that said signals from said plurality of oscillating means are inputted to be mixed together is equal to the power level of a light beam emitted from said light modulating means when said signals are inputted one by one.

14. A simultaneous multi-beam type light modulating apparatus comprising:

a plurality of oscillating means for generating signals whose frequencies differ from each other at equal frequency intervals;

a plurality of series means electrically connected to each of said plurality of oscillating means and for electrically connecting each of a plurality of level control means each used to control the amplitude of the signals generated from said plurality of oscillating means in response to each inputted control signal, to each of a plurality of switching means which are turned on or off based on image data;

inputting means for inputting, as a control signal, the sum of a signal for separately controlling the amplitude of each of the signals generated from said plurality of oscillating means and a signal for equally controlling the amplitude of each of said signals, to each of said plurality of level control means;

first mixing means for mixing together signals outputted from said plurality of series means wherein each group is combined such that at least two signals are included in one group and signals not adjacent to each other at the time when said signals outputted from said plurality of series means are arranged in order of frequency are included in the same groups;

second mixing means for mixing signals outputted from said first mixing means together into one; and light modulating means, responsive to signals outputted by said second mixing means, for dividing light beams incident with the intensity or level according to the amplitude of each of said signals outputted from said second mixing means and in the direction corresponding to the frequency of each of said signals to thereby emit the thus-divided light beams.

15. A simultaneous multi-beam type light modulating apparatus according to claim 14, wherein said first mixing means comprises means for combining said signals such that the intervals between adjacent frequencies of said signals not adjacent to each other are set equal to each other.

16. A simultaneous multi-beam type light modulating apparatus according to claim 14, wherein said first mixing means comprises means for combining said signals such that the intervals between the adjacent frequencies of said signals not adjacent to each other are set equal to each other and to the maximum.

17. A simultaneous multi-beam type light modulating apparatus according to claim 14, wherein said first fixing means comprises means for combining said signals into a plurality of groups which are represented in the form of the following expressions, when said signals whose frequencies differ from each other are $f_1, f_2, f_3, \ldots f_n$ (n is an even number), in such a manner that two signals are included in one group:

First group $f_1, f_{(n+2)/2}$
Second group $f_2, f_{(n+4)/2}$
Third group $f_3, f_{(n+6)/2}$
. .
. .
. .
n/2th group $f_{n/2}, f_n$

18. A simultaneous multi-beam type light-modulating apparatus according to claim 14, wherein said inputting means comprises means, responsive to said signal for separately controlling the amplitude of each of the signals generated from said plurality of oscillating means, for controlling the power levels of light beams emitted from said light modulating means at the time that the signals whose frequencies differ from each other are inputted one by one, so as to be identical to each other.

19. A simultaneous multi-beam type light modulating apparatus according to claim 14, wherein said inputting means comprises means, responsive to said signal for equally controlling the amplitude of each of the signals generated from said plurality of oscillating means, for controlling said amplitude such that said amplitude is increased as the number of the signals to be mixed by said second mixing means increases.

20. A simultaneous multi-beam type light modulating apparatus according to claim 14, wherein said inputting means comprises means, responsive to said signal for equally controlling said amplitude of each of the signals generated from said plurality of oscillating means, for setting each of the power levels of a plurality of light beams emitted from said light modulating means at the time that said signals from said plurality of oscillating means are inputted to be mixed together to equal to the power level of a light beam emitted from said light modulating means when said signals are inputted one by one.

* * * * *